March 6, 1951 A. W. KOGSTROM 2,544,331
VEHICLE WHEEL SUSPENSION
Filed Oct. 11, 1946 2 Sheets-Sheet 2

INVENTOR.
Axel W. Kogstrom
BY
*Barnes, Kisselle, Laughlin Raisch*
ATTORNEYS

Patented Mar. 6, 1951

2,544,331

UNITED STATES PATENT OFFICE 2,544,331

VEHICLE WHEEL SUSPENSION

Axel W. Kogstrom, Detroit, Mich., assignor to O. & S. Bearing Company, Detroit, Mich., a corporation of Michigan Application October 11, 1946, Serial No. 702,843

1 Claim. (Cl. 280—96.2)

This invention relates to a vehicle wheel suspension and more particularly to a suspension of the independent type commonly known as knee-action for the front wheels of automotive vehicles. Knee action suspensions of the type having upper and lower generally A-shaped arms which are pivoted to the frame on longitudinal axes have come into extensive use and provide a very satisfactory form of suspension. Because of the large number of oscillating joints in a suspension of this character, the matter of properly providing and maintaining the adjustment of the steering knuckle or stub axle as to caster and camber has been rather difficult with designs heretofore produced.

In Patent Number 2,123,089 to J. W. Leighton there is described a bolt type of adjustment in which a single member provides both caster and camber adjustment. In this patent the member that makes the adjustment is the inner bearing member having threaded engagement with an outer bearing member. In Patent Number 2,405,458 to T. W. Slack et al. a universal joint type of suspension is used and one ball joint has a shank joined at an angle with a supporting arm to give a caster-camber adjustment but the latter construction provides only a coarse adjustment. For any particular caster adjustment there are two points in a camber adjustment which will coincide therewith. Any other camber position will necessitate a change of caster adjustment.

It is an object of the present invention to provide a greatly simplified means for providing a fine adjustment for both caster and camber positions.

A further object is to provide in a suspension of this type, a single adjustable member by which both camber and caster may be adjusted with negligible interdependence of one adjustment upon the other.

Another object is to provide in a ball-type suspension, of the type described, a single rotatable sleeve which forms a coupling between two members of the suspension and which is so coordinated with the two members as to provide adjustments in at least two mutually perpendicular directions each substantially independent of the other.

Figure 1:
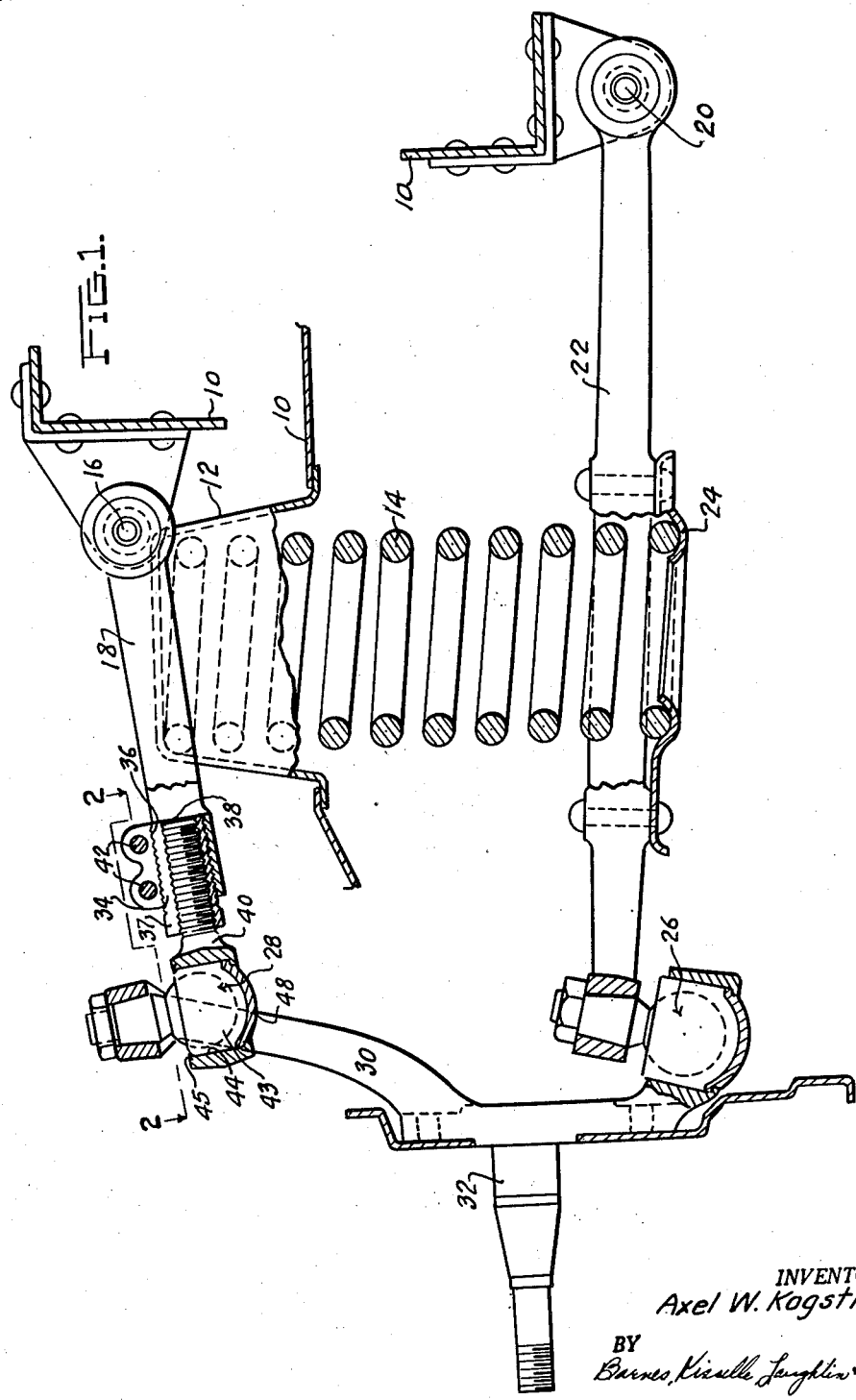
Figure 1 is a front view partly in section of a vehicle wheel suspension incorporating a preferred form of the present invention.
Figure 2:
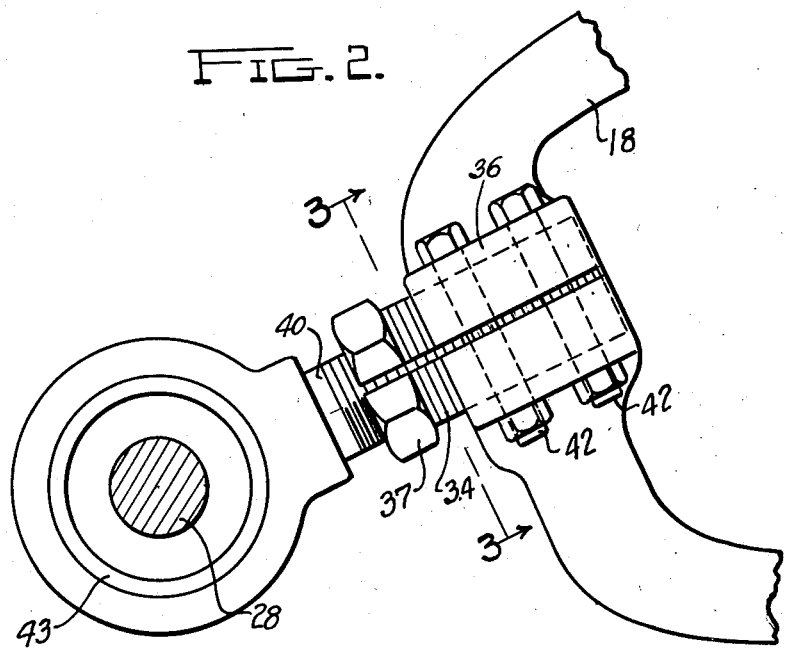
Figure 2 is a fragmentary top view of the upper arm of the suspension illustrated in Figure 1.
Figure 3:
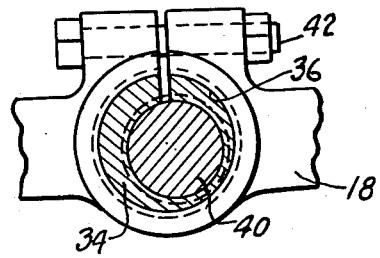
Figure 3 is a cross sectional view on line 3—3 of Figure 2.

Referring now to the drawing, there is shown a portion of a vehicle frame at 10 having a spring receiving socket 12 in which the upper end of a coil spring 14 is mounted. Pivoted to the frame at 16 is an upper arm 18 which is in the form of a generally A-shaped yoke having two pivots at 16 spaced apart a considerable fore and aft distance. Pivoted on the frame at a point 20 is a lower supporting arm 22 having a spring receiving pad 24 against which the lower end of spring 14 rests. The arm 22 is also of A-shape and pivoted at two widely spaced points on the frame. Pivoted by means of ball sockets 26 and 28 on the outer ends of the arms 18 and 22 is a steering knuckle 30 having a stub axle 32 of conventional form.

The improved camber and caster adjustment comprises a sleeve 34 which is threaded into a threaded split bore 36 formed in the arm 18. The sleeve 34 may have a hexagonal head 37 for receiving a suitable wrench. Sleeve 34 is provided with an internal threaded bore 38 which is eccentric to the outer surface of the sleeve and is threaded preferably with threads of a different pitch than the outer threads. The ball socket 28 is provided with a threaded stem 40 adapted to be received in the bore 38. The split bore 36 may be provided with a pair of clamping bolts 42 for tightening the threads of the bore rigidly against the outer threads of the sleeve 34. A socket member 43 has a press fit in bore 44 of stem 40 and the edges 45 of the bore are turned in to lock the assembly against the bottom closure member 48.

In operation it will be seen that the suspension acts in the well known manner of similar knee-action suspensions and that the steering knuckle 30 may be steered upon an axis passing through the centers of the ball and socket joints 26 and 28. The camber adjustment is obtained by shifting the upper ball socket laterally to the left or right in Figure 1, thus shifting the vertical plane of the wheel to tilt outwardly at the top to a greater or less degree. For this purpose the sleeve 34 may be rotated to thread it along the bore 36 and also along the threaded stem 40. Both these threads may be of the same hand but being of different pitch the stem 40 will be moved outwardly or inwardly in small increments with each revolution of the sleeve 34. Thus a very fine adjustment of camber may be obtained and the increment of movement for one complete revolution of the sleeve 34 is quite small.

Caster adjustment, namely, the tilting of the steering axis connecting ball joints 26 and 28 with its top rearwardly to a greater or less degree is also obtained by rotation of the sleeve 34. However, in this case, the complete range of adjustment is obtained in one-half revolution of the sleeve 34. Due to the eccentricity of the internal and external threads of the sleeve, it will be seen that the stem 40 may be shifted forwardly or rearwardly to any desired position by rotation of sleeve 34 through the desired angle. Such rotation, of course, will change the relation of the arm 18 to the steering knuckle 30 and motion of this character is permitted by the pivoted mounting of arms 18 and 22 as well as by the ball joints.

When an adjustment has been obtained, the sleeve 34 is tightly clamped by tightening the bolts 42 thus forming a rigid connection between the arm 18 and the knuckle 30. In order to make this connection more rigid, the sleeve 34, if desired, may also be split so that the clamping action of the bolts 42 are exerted on both the inner and outer threads of the sleeve.

It will thus be seen that there has been provided a simple construction wherein a single rotating member provides both in and out adjustment of the top of the knuckle relative to the upper suspension arm and fore and aft adjustment also. While the invention has been described with the adjustment at the top of the steering knuckle, it is obvious that other forms could be used, for example, the adjustment could be between the lower arm and the lower end of the knuckle.

I claim:

An adjustable mounting for a dirigible wheel of a vehicle which comprises, a pair of vertically spaced, laterally extending arms each pivotally mounted at one end thereof on the frame, a steering knuckle, a ball joint at the distal end of the lower arm comprising a first ball-ended stud, ball end down and substantially vertically positioned between the arm and the lower end of the knuckle, a second ball stud vertically depending, ball-end down, from the top of the steering knuckle, and means at the distal end of the upper arm connected to said second depending ball stud, said means comprising a socket member having a threaded shank end, an externally threaded sleeve having an axially eccentric threaded bore to receive the threaded shank, and a threaded bore in the said distal end of the upper arm to receive the threaded sleeve, the inner and outer threads of sleeve being of different pitch to permit fine camber adjustment, and means for clamping the threaded arm around the sleeve to lock the parts in adjusted relation.

AXEL W. KOGSTROM.

REFERENCES CITED

The following references are of record in the file of this patent:

UNITED STATES PATENTS

| Number | Name | Date |
|---|---|---|
| 923,724 | Sprado | June 1, 1909 |
| 2,099,144 | Holmes | Nov. 16, 1937 |
| 2,115,919 | Slack | May 3, 1938 |
| 2,238,879 | Dauben | Apr. 22, 1941 |
| 2,253,436 | Leighton | Aug. 19, 1941 |
| 2,290,923 | Wahlberg | July 28, 1942 |
| 2,405,458 | Slack et al. | Aug. 6, 1946 |

FOREIGN PATENTS

| Number | Country | Date |
|---|---|---|
| 137,381 | Great Britain | Jan. 15, 1920 |
| 286,424 | Great Britain | Mar. 8, 1928 |